R. F. DOWNEY & W. MURDOCH.
TRUCK LOADER.
APPLICATION FILED AUG. 2, 1917.
1,269,527.
Patented June 11, 1918.
2 SHEETS—SHEET 1.
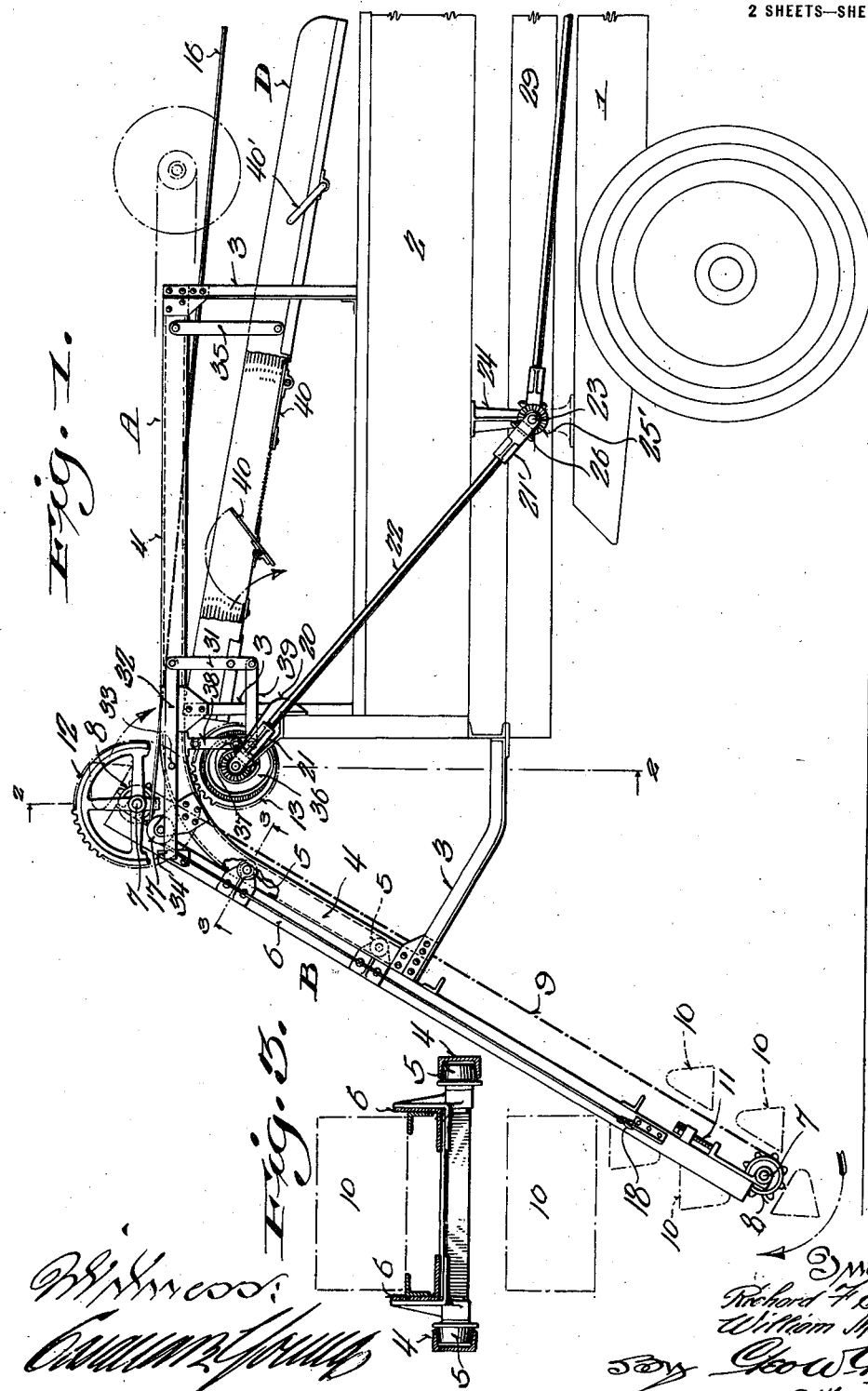

R. F. DOWNEY & W. MURDOCH.
TRUCK LOADER.
APPLICATION FILED AUG. 2, 1917.
1,269,527.
Patented June 11, 1918.
2 SHEETS—SHEET 2.
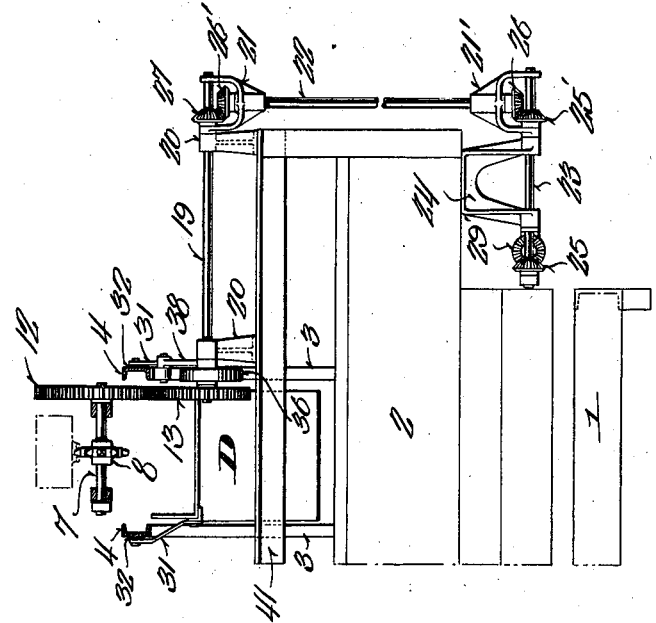
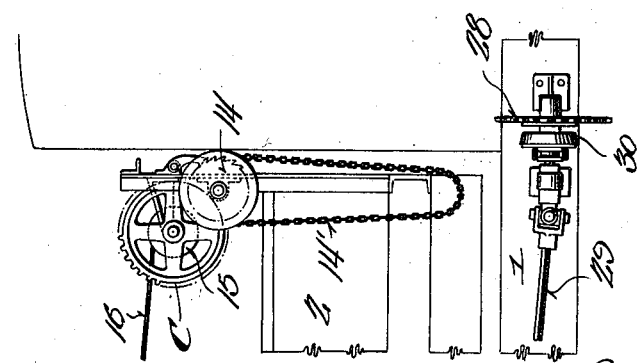

UNITED STATES PATENT OFFICE.

RICHARD F. DOWNEY, OF MILWAUKEE, AND WILLIAM MURDOCH, OF WEST ALLIS, WISCONSIN.

TRUCK-LOADER.

1,269,527.

Specification of Letters Patent.   Patented June 11, 1918.

Application filed August 2, 1917.   Serial No. 184,071.

*To all whom it may concern:*

Be it known that we, RICHARD F. DOWNEY and WILLIAM MURDOCH, a citizen of the United States and a subject of the King of England, respectively, (said MURDOCH having declared his intention to become a citizen of the United States,) and residents of Milwaukee and West Allis, respectively, in the county of Milwaukee and State of Wisconsin, have invented certain new and useful Improvements in Truck-Loaders; and we do hereby declare that the following is a full, clear, and exact description thereof.

Our invention relates to certain new and useful improvements in truck loading devices and refers particularly to such devices including an endless conveyer adapted to be disposed over the truck body when not in use.

The primary object of our present invention is to provide an efficient and compact device of the character stated which is driven by the engine of the truck upon which it is mounted.

Another object is to provide a novel form of supporting track for carrying the conveyer when in operative position and when in inoperative position and means for manually moving a conveyer along the track from operative to inoperative position.

A further object is to provide a novel form of discharge trough for distributing material picked up by said conveyer evenly in the truck body, which will have means for reciprocating the same to prevent the material from clogging therein.

A still further object of our invention is to provide a loading device which will automatically become inoperative upon being shifted from loading position to its position over the truck body, and further to provide means whereby upon the movement of the conveyer from operative to inoperative position, the discharge trough will be dropped sufficiently to permit the disposition of the conveyer over the truck body.

With the above and other objects in view which will appear as the description proceeds our invention resides in the novel construction, combination and arrangement of parts substantially as hereinafter described and particularly defined by the appended claims, it being understood that such changes in the precise embodiment of the herein disclosed invention may be made as come within the scope of the claims.

In the accompanying drawings we have illustrated one complete example of the physical embodiment of our invention constructed according to the best mode we have so far devised for the practical application of the principles thereof, in which:

Figure 1 is a side elevational view of our invention, illustrating the same as applied to an automobile truck, only the rear portion of the truck being shown by conventional outlines.

Fig. 1ᵃ is a side elevational view of the operating means for the conveyer, the front portion of the automobile truck being shown by conventional outlines.

Fig. 2 is a view part in section and part in elevation of our invention, said view being taken on the plane indicated by line 2—2 of Fig. 1, and Fig. 3 is a transverse sectional view through the conveyer member of our invention taken on the line 3—3 of Fig. 1.

Referring now more particularly to the accompanying drawings the numeral 1 designates the chassis of an automobile truck upon which is pivotally mounted a truck body 2, all of which may be of any desired make or construction and represents no important part of the present invention.

Carried by the body 2 by means of the supports or braces 3 is a track A comprising rails 4 U-shaped in cross section and having their open faces in opposed relation. The track A has a horizontal portion disposed longitudinally above the body 2 and a downwardly inclined portion extending from the rear of said body, and tracking in said rails 4 are wheels 5 carried by a suitable frame member B comprising the pair of angle plates or sills 6.

Journaled in each end of the frame B is a transverse shaft 7 having mounted thereon a sprocket wheel 8 for carrying an endless chain or belt 9 upon which is mounted a series of buckets or flights 10, the lowermost of said shafts 7 being adjustable by means of an adjusting screw 11 for regulating the tension of the conveyer belt 9, and the uppermost shaft 7 has mounted thereon a gear wheel 12 adapted for selective engagement with a driving gear wheel 13 to be later described.

As will be apparent, the frame B is slidable along the entire length of the track A and when the conveyer is in operation, as best shown in Fig. 1, the same is carried by the downwardly inclined portion of the track, but when the same is not in use it is carried by the horizontal portion of the track where the same is out of the way. For moving the frame B carrying the conveyer, a hand windlass C is provided mounted upon the forward end of the body 2 and comprising a chain sheave 14 having a hand chain 14' engaging the same and adapted upon rotation to revolve a drum 15 to wind thereon a cable 16 which passes along the body 2 over a guide pulley 17 journaled at the curved portion of the track A juxtaposed the downwardly extending portion and being secured at 18 to the lower end of the frame B. The form of windlass just described is of the usual type, and in place of the same the drum 15 may be connected with the engine, not shown, of the automobile as will be obvious.

The gear wheel 13 is carried by the inner end of a shaft 19 journaled in suitable bearings 20 mounted upon the rear end of the body 2 and journaled on the end of said shaft outwardly of the outermost of said bearings 20 are the forked arms of a bearing block 21 having journaled therein one end of a shaft 22 which has its lower end journaled in a like bearing block 21' having its forked end journally engaging the outer end of a shaft 23. The shaft 23 is journaled in suitable bearings 24 in axial alinement with the pivot of the truck body 2 and has mounted on ends thereof beveled gears 25 and 25', the beveled gear 25' being intermediate the arms of the bearing block 21' and in mesh with a beveled gear 26 carried by the lower end of said shaft 22. The upper end of the shaft 22 has mounted thereon a beveled gear 26' in mesh with a beveled gear 27 carried by said shaft 19 intermediate the arms of bearing block 21.

This manner of connecting shafts 19 to 23 permits the movement of the body 2 on its pivot without disturbing the connection therebetween as will be apparent, and power is transmitted to shaft 23 by means of a sprocket wheel 28 connected with the engine of the truck, not shown, and adapted to rotate a shaft 29 carrying at its outer end a beveled gear 29' meshing with the beveled gear 25 of said shaft 23. A suitable clutch connection 30 is disposed intermediate the sprocket wheel 28 and the shaft 29 to permit the rendering of said shaft inoperative.

A distributing trough D has its rear end pivotally carried by a lever 31 having its upper end pivoted to a lever 32 intermediately pivoted to the track A as at 33 and having its outer free end held stationary by means of a keeper 34 carried by the frame B, to be later described, and has its forward portion pivotally supported from the track by means of a link 35. This trough D is adapted to be reciprocated upon the rotation of shaft 19 by means of a cam 36 mounted upon said shaft intermediate gear 13 and adjacent bearing 20 and tracking thereon is a wheel 37 carried by a link 38 pivoted at its upper end to a portion of track A and at its lower end to one end of a link or lever 39 having its other end pivotally connected with the lower end of lever 31, whereby upon rotation of cam 36, trough D will be reciprocated.

As best shown in Fig. 1 the trough D is inclined toward the forward end of body 2 and has its outer end juxtaposed to the upper or discharge end of the conveyer to receive material therefrom, and in order to provide for the equal discharge of material in the body 2, the trough D has in its bottom a series of gates or doors 40 operated by handles 40'. The purpose of the doors 40 is that when the forward end of the body 2 is loaded, the first door 40 will then be opened to stop the material and discharge it therethrough, and then the next door will be opened, and so on as will be obvious.

When the conveyer frame B is moved to its dotted line position shown in Fig. 1 the rear end of the trough D will be dropped to rest upon the ledge 41 to allow room for the conveyer, this being accomplished by the keeper 34 releasing the outer end of lever 32. When the conveyer is returned to operative position at the rear of the truck the keeper 34 will automatically engage the end of lever 32 and lift the outer end of trough D again to its position shown in Fig. 1.

An important feature of our invention is that when the conveyer is disposed along the horizontal portion of track A, the same is rendered inoperative by reason of gear wheel 12 disengaging gear wheel 13 and thus preventing the occurrence of damage or accident should the clutch member 30 be accidentally connected to revolve gear 13.

We claim:

1. The combination with a pivoted dump truck body, of a loading device therefor comprising an endless conveyer adapted to discharge into said body and to be disposed over the truck when not in use.

2. The combination with a pivoted dump truck body, of a loading device therefor comprising an endless conveyer adapted to engage a pile of material and discharge the same into the truck body, and means for disposing said conveyer over said body and out of the way when not in use, substantially as described.

3. The combination with a pivoted dump truck body, of a track carried thereby, and a conveyer adapted to extend downwardly toward the ground and to discharge material into said body, said conveyer being movable on said track to be disposed over said truck body when not in use.

4. The combination with a pivoted dump truck body, of a conveyer carried thereby and adapted to engage material to discharge the same into said body, a trough disposed adjacent the discharge end of the conveyer to procure the even distribution of material in said body, and means for disposing the conveyer over the truck body when not in use.

5. The combination with a pivoted dump truck body, of a conveyer carried thereby and adapted to engage material to discharge the same into said body, a trough disposed adjacent the discharge end of the conveyer to procure the even distribution of material in said body, and means operable by moving said conveyer to a position over the body for dropping said trough a slight distance substantially as described.

6. The combination with a truck body of a loading device carried thereby comprising a track carried by the body and including a horizontal portion disposed above the body and a downwardly extending portion, a frame carried by said track and movable thereon, a conveyer carried by said frame, said frame being carried by the downwardly extending portion of the track when the conveyer is in use and by the horizontal portion when the same is not in use.

7. The combination with a truck body of a loading device therefor comprising a track having a horizontal portion disposed over the truck body and a downwardly extending portion, a conveyer carried by said track and adapted when in use to be carried by the downwardly extending portion and when not in use to be carried by the horizontal portion of said track, a driven gear adjacent said track, and an operating gear for the conveyer engageable with said driven gear.

8. The combination with a truck body of a loading device therefor comprising a track having a horizontal portion disposed over the truck body and a downwardly extending portion, a conveyer carried by said track and adapted when in use to be carried by the downwardly extending portion and when not in use to be carried by the horizontal portion of said track, a driven gear adjacent said track, and an operating gear for the conveyer engageable with said driven gear, said operating gear disengaging the driven gear when the conveyer is carried by the horizontal portion of the track.

9. The combination with a truck body, of a loading device therefor comprising a track having a portion extending longitudinally over the truck body and a portion extending outwardly and downwardly from the rear of said truck body, a conveyer slidably mounted on said track and adapted to be carried by the downwardly extending portion when in operation and to be carried by the portion over the body when not in use, and means for operating said conveyer.

10. The combination with a truck body, of a loading device therefor comprising a track having a horizontal portion extending longitudinally over said body and an inclined portion extending downwardly from the rear thereof, a conveyer member carried by said track and adapted to engage the inclined portion thereof when in operation and to engage the horizontal portion when not in use, means for operating the conveyer, and means for moving the conveyer from operative to inoperative position substantially as described.

11. The combination with truck body, of a loading device therefor comprising a track having a horizontal portion disposed longitudinally above said body and a downwardly inclined portion extending from the rear thereof, an endless bucket conveyer mounted in a supporting frame engaging said track, means for operating said conveyer, a windlass located forwardly of said body, and a cable leading from said windlass and connected with the lower end of said conveyer frame and adapted to move said conveyer frame along said track to dispose the same along the horizontal portion thereof substantially as described.

12. The combination with an automobile truck, of a track carried by the body thereof and including a horizontal and a downwardly inclined portion, a conveyer carrying frame mounted for travel on said track and adapted to extend rearwardly from said body when in operation and to be disposed thereabove on the horizontal portion of said track when not in use, means connected with the motor of said truck for operating the conveyer when in operative position, and a distributing trough having one end adjacent the discharge end of said conveyer and having means to accomplish the equal distribution of material in said body.

13. The combination with an automobile truck, of a track carried by the body thereof and including a horizontal and a downwardly inclined portion, a conveyer carrying frame mounted for travel on said track and adapted to extend rearwardly from said body when in operation and to be disposed thereabove on the horizontal portion of said track when not in use, means connected with the motor of said truck for operating the conveyer when in operative position, a distributing trough having one end adjacent discharge end of said conveyer and having means to accomplish the equal distribution of material in said body, means for reciprocating said trough, and manually operated means for shifting the conveyer from operative position to inoperative position.

14. The combination with a truck body, of a loading device therefor comprising a track having a portion disposed over the body and a downwardly extending portion, and a conveyer mounted on said track and adapted to be carried by the downwardly extending portion when in use and by the portion of the track disposed over the body when not in use.

15. The combination with a truck, of a dumping body tiltably mounted thereon, a loading device therefor, a reciprocal distributing trough adapted to discharge in said body and having one end adjacent the discharge end of said loading device, and a common means for operating said loading device and distributing trough.

In testimony that we claim the foregoing we have hereunto set our hands at Milwaukee in the county of Milwaukee and State of Wisconsin.

RICHARD F. DOWNEY.
WILLIAM MURDOCH.